(12) United States Patent
Orr

(10) Patent No.: US 6,784,879 B1
(45) Date of Patent: Aug. 31, 2004

(54) METHOD AND APPARATUS FOR PROVIDING CONTROL OF BACKGROUND VIDEO

(75) Inventor: Stephen Jonathan Orr, East York (CA)

(73) Assignee: ATI Technologies Inc., Markham (CA)

( * ) Notice: Subject to any disclaimer, the term of this patent is extended or adjusted under 35 U.S.C. 154(b) by 0 days.

(21) Appl. No.: 08/892,472

(22) Filed: Jul. 14, 1997

(51) Int. Cl.[7] .................................................. G09G 5/00
(52) U.S. Cl. ...................................... 345/212; 345/204
(58) Field of Search .............................. 345/205, 211, 345/348, 327, 352, 354, 629, 630, 634, 581, 204, 212, 214; 348/563, 564, 565, 569, 570; 725/39, 40, 49

(56) References Cited

U.S. PATENT DOCUMENTS

| | | | | |
|---|---|---|---|---|
| 5,321,805 A | * | 6/1994 | Hayman et al. ............ | 395/162 |
| 5,521,841 A | * | 5/1996 | Arman et al. .............. | 364/514 |
| 5,668,571 A | * | 9/1997 | Pai et al. .................... | 345/114 |
| 5,754,170 A | * | 5/1998 | Ranganathan .............. | 345/185 |
| 5,761,417 A | * | 6/1998 | Henley et al. ........ | 395/200.09 |
| 5,831,590 A | * | 11/1998 | Ikedo ......................... | 345/113 |

\* cited by examiner

Primary Examiner—Vijay Shankar
(74) Attorney, Agent, or Firm—Vedder, Price, Kaufman & Kammholz, P.C.

(57) ABSTRACT

A method and apparatus for controlling background video on a computer display is accomplished by providing a video control icon, which is visible on the display. The video control icon relates to the live video being displayed as the background. Once selection of the video control icon has been detected, the computer displays a control panel for the live video while the live video remains in the background. As such, when a user desires to change an attribute of the live video, the user selects the video control icon which pops up a control panel. The user then makes an adjustment via the control panel to the live video and once such an adjustment is made, the control panel is removed from the screen. All this done while the live video remains in the background, thus other applications that were in focus remain in focus.

24 Claims, 3 Drawing Sheets

METHOD AND APPARATUS FOR PROVIDING CONTROL OF BACKGROUND VIDEO

TECHNICAL FIELD OF THE INVENTION

This invention relates generally to computer displays and more particularly to providing control of background video.

BACKGROUND OF THE INVENTION

Computers are known to include a central processing unit, cache memory, hard drive memory, floppy disk drive memory, CD ROM drive, audio processing circuitry, and video processing circuitry. The computer further includes a computer monitor which provides visual representations of the data being manipulated. Such visual representations are originated from, for example, a word processing algorithm, a drawing algorithm, and, more recently, the displaying of video images. Such video images may be received from a live television broadcast, video cassette player, satellite television, cable television, or DVD players.

The displaying of live video on a computer monitor may be done in several ways. A first displaying approach is to have the live video being displayed in the entire display area of the computer monitor. As such, the computer is acting very much like a television where the only service that is being provided is the displaying of the live video. Alternatively, the live video may be presented in a window of the computer screen while other applications are running. As another alternative, the live video may be in the background of the computer screen.

In the background mode, the live video is acting as the desktop pattern. In this mode, when any attribute of the live video is to be changed, the background video must be brought forward, or brought into focus. Attributes of the live video include changing the channel, volume adjust, muting, selecting a previous channel, etc. Once the live video has been brought forward, such attributes may be changed through any graphical user interfaces.

When an attribute of the live video is to be changed, other applications that were in focus (i.e., actively being displayed and/or being worked upon) must go into a background mode (i.e., taken out of focus). As such, the adjusting of attributes of the live video consume the activity of the computer until such attributes have been changed and the live video is returned to the background mode. As one can readily appreciate, this can be somewhat burdensome to the user and is an ineffective use of the computer system.

Therefore, a need exists for a method and apparatus for providing control of background video while the video remains in the background.

DETAILED DESCRIPTION OF THE DRAWINGS

Generally, the present invention provides a method and apparatus for controlling background video on a computer display. This may be accomplished by providing a video control icon, which is visible on the display. The video control icon relates to the live video being displayed as the background. Once selection of the video control icon has been detected, the computer displays a control panel for the live video while the live video remains in the background. As such, when a user desires to change an attribute of the live video, the user selects the video control icon which pops up a control panel. The user then makes an adjustment via the control panel to the live video and once such an adjustment is made, the control panel is removed from the screen. All this done while the live video remains in the background, thus other applications that were in focus remain in focus.

Figure 1:
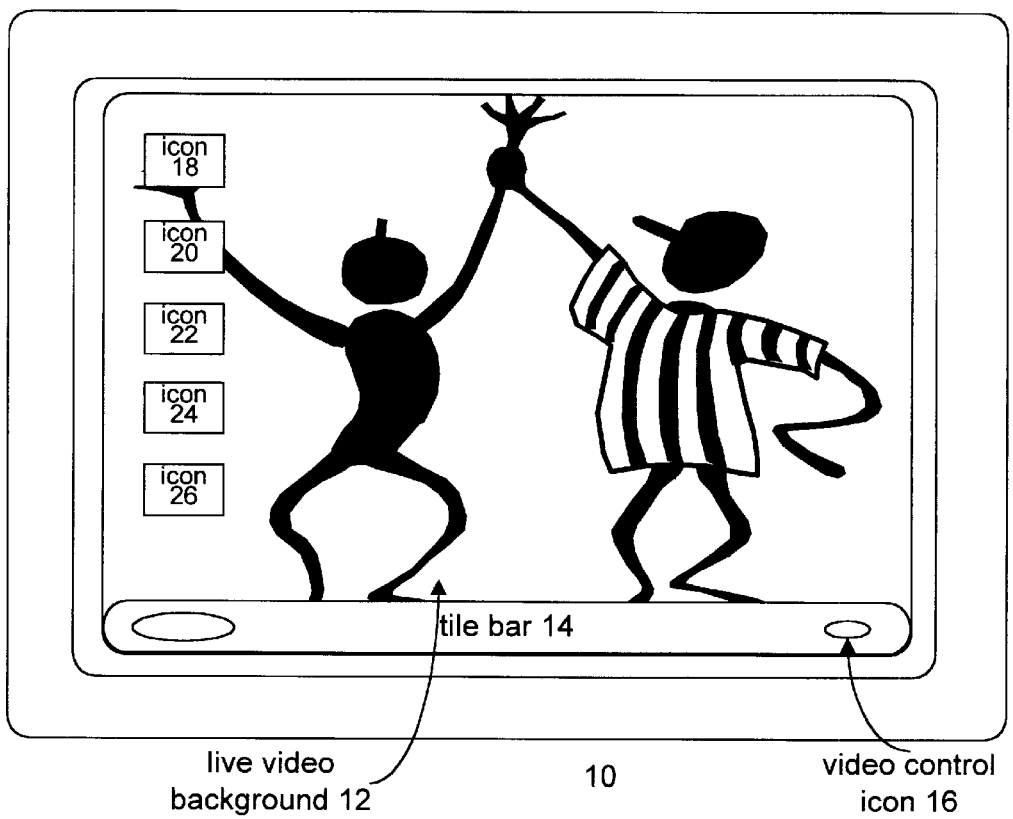
FIG. 1 illustrates a graphical representation of controlling background video in accordance with the present invention.
Figure 1:
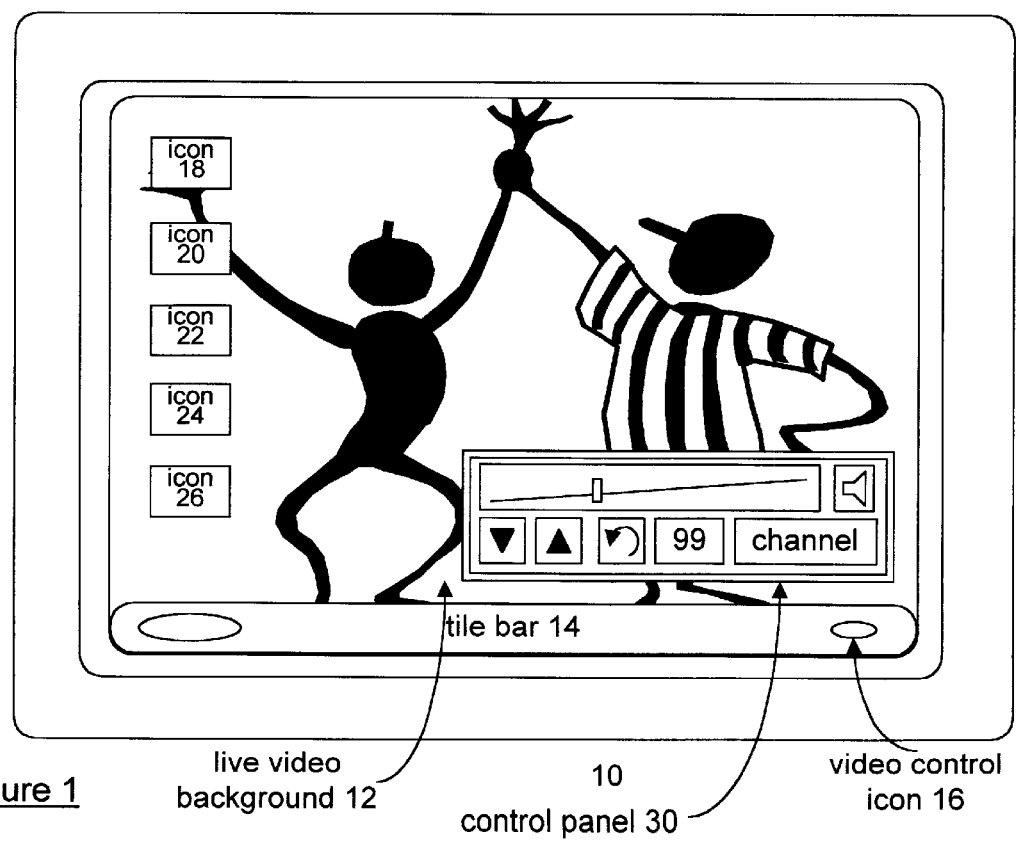

The present invention can be more fully described with reference to FIGS. 1 through 4. FIG. 1 illustrates a graphical representation of a computer screen 10 which has a live video background 12, a tile bar 14, a video control icon 16, and a plurality of icons 18–26. As shown in the top portion of the figure, the live video is in the background as such the tile bar 14, the video control icon 16, and the icons 18–26 are in focus, i.e., overlaying the live background video 12. Once the video control icon 16 has been selected, which may be done using a cursor selection of a mouse, a touch screen selection, a keyboard selection, or any other means for selecting an icon, the control panel 30 is presented in focus.

While the control panel 30 is in focus, the live video remains in the background. The control panel 30 is shown to include a channel up button, a channel down button, previous channel button, an indication of the current channel as a numeric value, an alpha-numeric value, a mute button, and a sliding scale for volume. Such a control panel is utilized for live video being sourced from a live television broadcast, satellite television, or cable television.

If, the live video is being provided from a DVD player or VCR, the control panel would include at least one of a volume adjust icon, a mute icon, a pause icon, a re-wind icon, and a fast forward icon. Once the user has made a selection via the control panel, the control panel will defocus either immediately upon making the selection, with a predetermined period of time, or when another icon or application is selected. Such a predetermined time period may be in the range of a few hundred milliseconds to several seconds.

Figure 2:
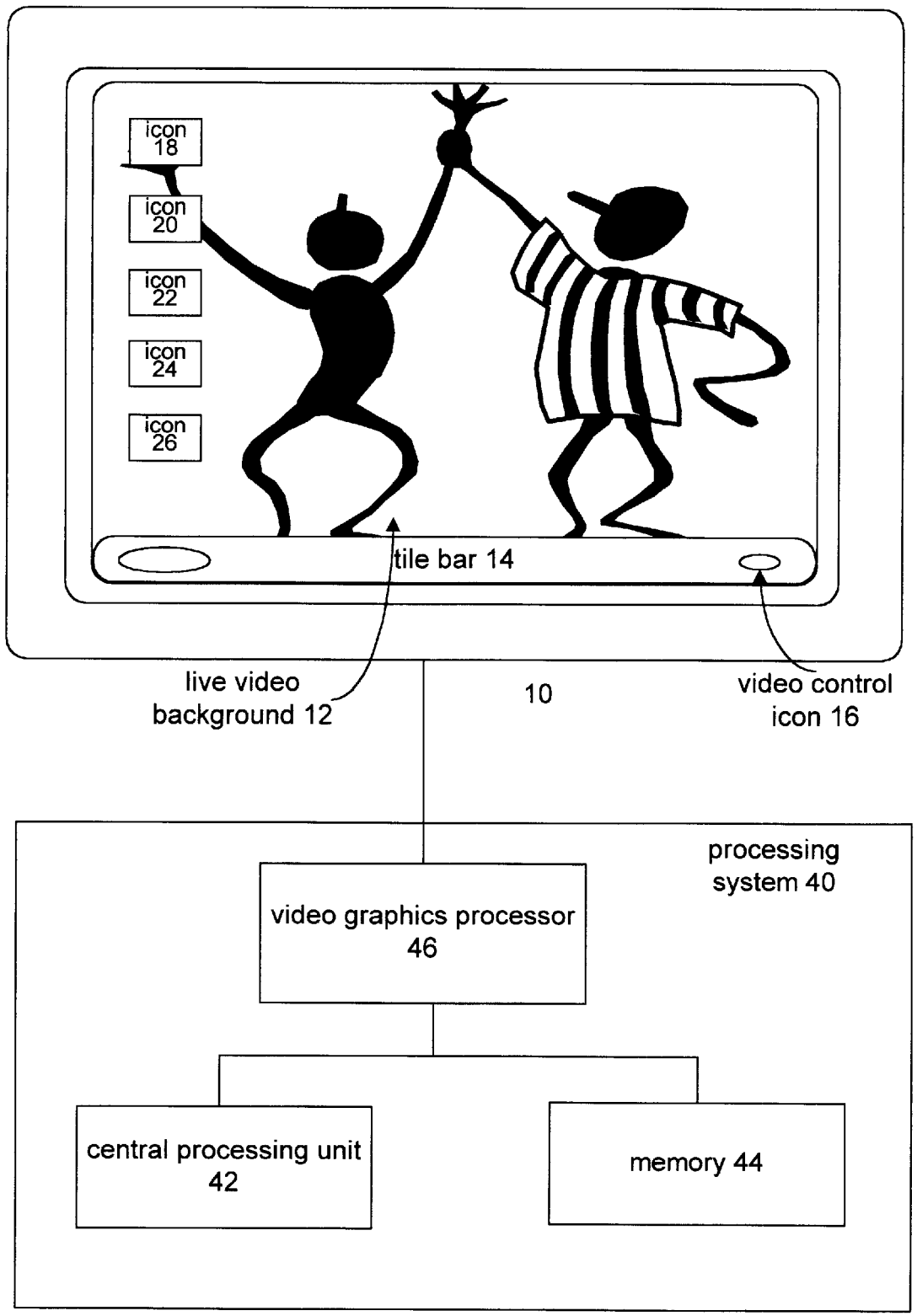
FIG. 2 illustrates a schematic block diagram of a processing system which is in accordance with the present invention.

FIG. 2 illustrates a schematic block diagram of a processing system 40 which includes a central processing unit 42, memory 44, and a video graphics processor 46. The processing system 40 is operably coupled to the computer display 10. The central processing unit 42 may include a microprocessor, microcontroller, a digital signal processor, a microcomputer, or any other means for processing digital information based on programming instructions. The memory may be cache memory, hard drive, floppy disk, CD ROM, or any other means for storing digital information. The memory stores the programming instructions relating to the operations depicted in FIGS. 3 and 4.

The video graphics processor 46 may be a separate device such as those manufactured by ATI Technologies, for example, RAGE 1, RAGE 2, RAGE 3 and the All-In-Wonder board. Alternatively, the video graphics processor may be part of the central processing unit or operation in conjunction with the central processing unit. In operation, to perform the control of the background video, the central processing unit and/or the video graphic processor perform the programming instructions relating to the logic diagrams of FIGS. 3 and 4.

Figure 3:
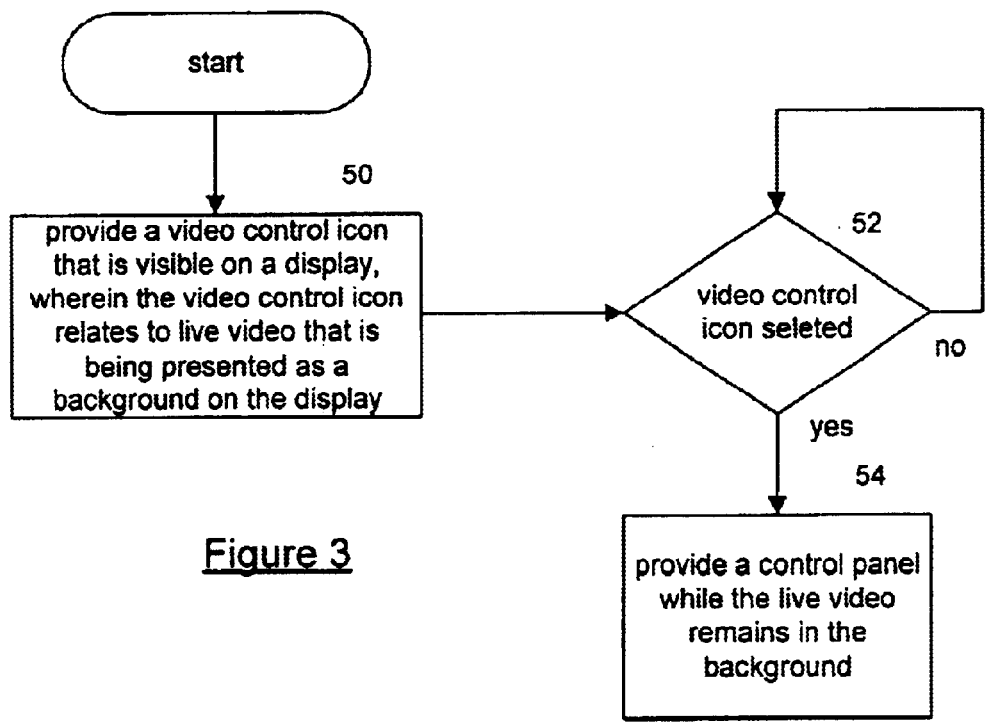
FIG. 3 illustrates a logic diagram which may be used to control background video in accordance with the present invention.

FIG. 3 illustrates a logic diagram which may be performed by the processing system 40. The process begins at step 50 where a video control icon is provided visibly on the computer display. The video control icon relates to live video that is being presented as background on the display. Such background may be the desktop portion of the computer's display, wherein the live video may be sourced from a DVD player, live television broadcast, video cassette player, satellite television, or cable television. The live video may be displayed on a computer display, a television, or a monitor.

With the video control icon being displayed, the process proceeds to step 52 where a determination is made as to whether the video control icon has been selected. The video control icon may be selected using any number of graphical user interface input means, such as a mouse, keyboard command, touch-screen, etc. Once the video icon has been selected, the process proceeds to step 54 where a control panel is provided on the computer display while the live video remains in the background. The control panel will remain on screen until an attribute of the live video has been changed or until another displayed element is selected. Such displayed elements my be another icon or an open application.

Figure 4:
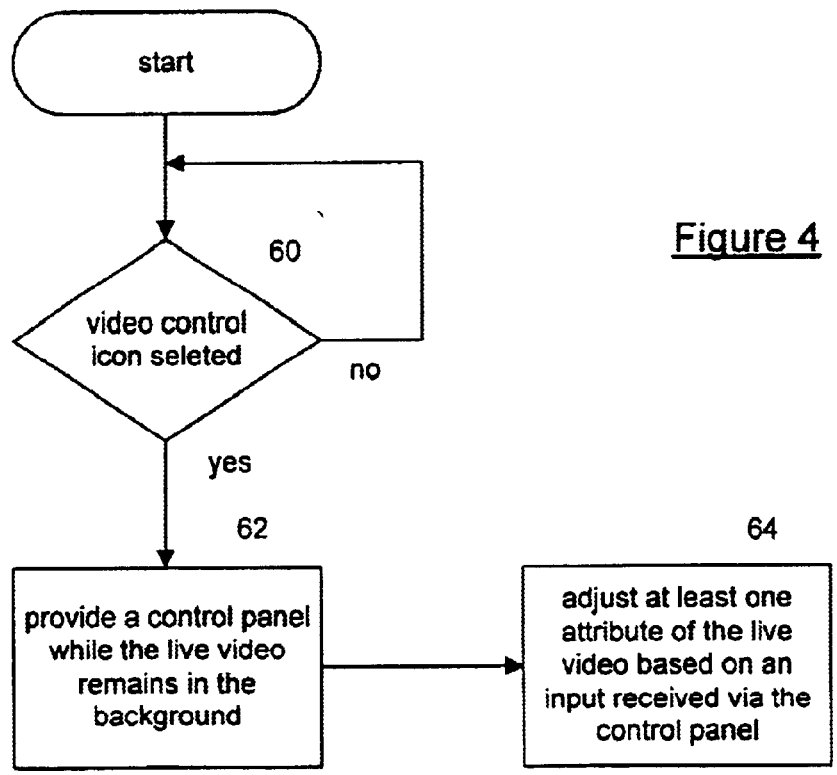
FIG. 4 illustrates a logic diagram which may also be used to control background video in accordance with the present invention.

FIG. 4 illustrates another logic diagram which may be implemented by the processing system 40. The process begins at step 60 where a determination is made as to whether the video control icon has been selected. Once selected, the process proceeds to step 62 where a control panel is provided on screen while the live video remains in the background. Having done this, the process proceeds to step 64 where at least one attribute of the live video is adjusted via the control panel. The attributes may be volume adjust, mute, channel up, channel down, numerical channel display, and/or alpha-numeric channel display when the live video is being sourced by live television broadcast, satellite television, or cable television. If the live video is being sourced by a DVD player, or VCR, the attributes may be volume adjust, mute, pause, rewind, and/or fast forward. Once a selection has been made, or anther displayed element has been selected, the control panel is removed from the display.

The preceding discussion has presented a method and apparatus for controlling background video. By providing a video control icon which, when selected, pops up a control panel, live video can remain in the background while its attributes are changed via the control panel. This allows a user to simply adjust the attributes of the live background video without having to bring it in focus. As such, the overall operations of a computer system is improved.

What is claimed is:

1. A method for providing control of background video, the method comprising the steps of:
    (a) providing a video control icon that is visible on the display, wherein the video control icon relates to live video that is being presented as a background on a display wherein the live video is received from at least one of the following: a DVD player, live television broadcast, a recording device, a satellite television broadcast and a cable television broadcast;
    (b) detecting selection of the video control icon; and
    (c) when the video control icon has been selected, providing a control panel while the live video remains in the background and an application that was in focus remains in focus.

2. The method of claim 1 further comprises providing, as the control panel, at least one of: volume adjust icon, mute icon, pause icon, rewind icon, and fast-forward icon.

3. The method of claim 1 further comprises providing, as the control panel, at least one of: volume adjust icon, mute icon, channel up icon, channel down icon, numerical channel display, and alpha-numeric channel display.

4. The method of claim 1 further comprises removing the control panel when another displayed element is selected.

5. The method of claim 1 further comprises, within step (a), providing the live video as the background on a computer display, a television, or a monitor.

6. A method for providing control of background video, the method comprising the steps of:
    (a) detecting selection of a video control icon, wherein the video control icon relates to live video that is being presented as a background on a display wherein the live video is received from at least one of the following: a DVD player, live television broadcast, a recording device, a satellite television broadcast and a cable television broadcast;
    (b) when the video control icon has been selected, providing a control panel while the live video remains in the background and an application that was in focus remains in focus; and
    (c) adjusting at least one attribute of the live video based on an input received via the control panel.

7. The method of claim 6 further comprises, within step (c) adjusting the at least one attribute by adjusting at least one of: volume, mute, pause, rewind, and fast-forward.

8. The method of claim 6 further comprises, within step (c), adjusting the at least one attribute by adjusting at least one of: volume, mute, channel up, and channel down.

9. The method of claim 6 further comprises removing the control panel when another displayed element is selected.

10. The method of claim 6 further comprises, within step (a), providing the live video as the background on a computer display, a television, or a monitor.

11. A video graphics processor comprising:
    a processing unit; and
    memory that stores programming instructions that, when read by the processing unit, causes the processing unit to (a) provide a video control icon that is visible on the display, wherein the video control icon relates to live video that is being presented as a background on a display; (b) detect selection of the video control icon; (c) provide a control panel while the live video remains in the background and an application that was in focus remains in focus when the video control icon has been selected, wherein the control panel includes at least one of the following: a volume adjust icon, a mute icon, a pause icon, a rewind icon, and a fast-forward icon.

12. The video graphics processor of claim 11 further comprises, within the memory, programming instructions that, when read by the processing unit, causes the processing unit to provide, as the control panel, at least one of: volume adjust icon, mute icon, channel up icon, channel down icon, numerical channel display, and alpha-numeric channel display.

13. The video graphics processor of claim 11 comprises, within the memory, programming instructions that, when read by the processing unit, causes the processing unit to remove the control panel when another displayed element is selected.

14. A video graphics processor comprising:
a processing unit; and
memory that stores programming instructions that, when read by the processing unit, causes the processing unit to (a) detect selection of a video control icon, wherein the video control icon relates to live video that is being presented as a background on a display; (b) provide a control panel while the live video remain the background and an application that was in focus remains in focus when the video control icon has been selected; and (c) adjust at least one attribute of the live video based on an input received via the control panel, wherein the at least one attribute included: volume, mute, pause, rewind, and fast-forward.

15. The video graphics processor of claim 14 further comprises, within the memory, programming instructions that, when read by the processing unit, causes the processing unit to adjust the at least one attribute by adjusting at least one of: volume, mute, channel up, and channel down.

16. The video graphics processor of claim 14 further comprises, within the memory, programing instructions that, when read by the processing unit, causes the processing unit to remove the control panel when another displayed element is selected.

17. A digital storage device that stores programming instructions that, when read by a processing unit, causes the processing unit to provide control of background video, the digital storage device comprises:

first storage means for storing programming instructions that, when read by the processing unit, causes the processing unit to provide a video control icon that is visible on the display, wherein the video control icon relates to live video that is being presented as a background on a display;

second storage means for storing programming instructions that, when read by the processing unit, causes the programming unit to detect selection of the video control icon; and third storage means for storing programming instructions that, when read by the processing unit, causes the processing unit to provide a control panel while the live video remains in the background and an application that was in focus remains in focus when the video control icon has been selected.

18. The digital storage device of claim 17 further comprises means for storing programming instructions that, when read by the processing unit, causes the processing unit to provide, as the control panel, at least one of: volume adjust icon, mute icon, pause icon, rewind icon, and fast-forward icon.

19. The digital storage device of claim 17 further comprises means for storing programming instructions that, when read by the processing unit, causes the processing unit to provide, as the control panel, at least one of: volume adjust icon, mute icon, channel up icon, channel down icon, numerical channel display, and alpha-numeric channel display.

20. The digital storage device of claim 17 further comprises means for storing programming instructions that, when read by the processing unit, causes the processing unit to remove the control panel when another displayed element is selected.

21. A digital storage device that stores programming instructions tat, when read by a processing unit, causes the processing unit to provide control of background video, the digital storage device comprises:

first storage means for storing programming instructions that, when read by the processing unit, causes the processing unit to detect selection of a video control icon, wherein the video control icon relates to live video that is being presented as a background on a display;

second storage means for storing programming instructions that, when read by the processing unit, causes the processing unit to provide a control panel while the live video remains in the background and an application that was in focus remains in focus when the video control icon has been selected; and second storage means for storing programming instructions that, when read by the processing unit, causes the processing unit to adjust at least one attribute of the live video based on an input received via the control panel.

22. The digital storage device of claim 21 further comprises means for storing programming instructions that, when read by the processing unit, causes the processing unit to adjust the at least one attribute by adjusting at least one of: volume, mute, pause, rewind, and fast-forward.

23. The digital storage device of claim 21 further comprises means for storing programming instructions that, when read by the processing unit, causes the processing unit to adjust the at least one attribute by adjusting at least one of: volume, mute, channel up, and channel down.

24. The digital storage device of claim 21 further comprises means for storing programming instructions that, when read by the processing unit, causes the processing unit to remove the control panel when another displayed element is selected.

* * * * *